(12) United States Patent
Solignac

(10) Patent No.: US 6,321,798 B1
(45) Date of Patent: Nov. 27, 2001

(54) METHOD, DEVICE AND INSTALLATION FOR DISPENSING DOSED AMOUNTS OF LIQUID

(76) Inventor: Jean-Pierre Solignac, 5, les Hauts de Pourols, F-34270 Saint Mathieu de Tréviers (FR)

( * ) Notice: Subject to any disclaimer, the term of this patent is extended or adjusted under 35 U.S.C. 154(b) by 0 days.

(21) Appl. No.: 09/254,337
(22) PCT Filed: Sep. 8, 1997
(86) PCT No.: PCT/FR97/01582
§ 371 Date: Sep. 12, 1999
§ 102(e) Date: Sep. 12, 1999
(87) PCT Pub. No.: WO98/09911
PCT Pub. Date: Mar. 12, 1998

(30) Foreign Application Priority Data

Sep. 6, 1996 (FR) .................................................. 96 11004
Mar. 23, 1997 (FR) .................................................. 97 06436

(51) Int. Cl.⁷ ................................. B65B 1/04; B65B 3/04
(52) U.S. Cl. .................................... 141/2; 141/83; 141/95; 141/192; 141/227
(58) Field of Search ................................... 141/2, 83, 95, 141/128, 192, 198, 227; 222/64, 68; 177/122

(56) References Cited

U.S. PATENT DOCUMENTS

| 3,636,994 | * | 1/1972 | Lilljeforss | .............................. 141/83 |
| 5,035,350 | * | 7/1991 | Blette et al. | ........................... 222/212 |
| 5,228,486 | * | 7/1993 | Henninger | ............................. 141/198 |
| 5,515,888 | * | 5/1996 | Graffin | ...................................... 141/1 |

\* cited by examiner

Primary Examiner—Timothy L. Maust
(74) Attorney, Agent, or Firm—Harrison & Egbert

(57) ABSTRACT

The method for dispensing dosed amounts of a liquid contained in a storage reservoir connected to a dispensing duct provided with a nozzle for delivering the liquid into a receptacle associated with an indicator, delivering in the form of a signal representative of the value of the amount of liquid present in the receptacle and said duct distant from the nozzle, being associated with a closing mechanism which, by command, closes or releases the passage of the liquid through the duct, including the following steps: a) releasing the passage of the liquid between the reservoir and the nozzle by operating the closing mechanism, so that the liquid can fill the portion of the duct between the closing element and the dispensing nozzle; b) closing the passage of the liquid by operating the closing mechanism to interrupt the liquid flow; c) applying on the liquid column between the closing mechanism and the dispensing nozzle, at least a mechanical pulse of calibrated amplitude and/or intensity, for expelling from the liquid column, a micro-amount of liquid; d) comparing the value shown by the indicator and a predetermined index value C1; e) and repeating steps c) and d).

10 Claims, 5 Drawing Sheets

METHOD, DEVICE AND INSTALLATION FOR DISPENSING DOSED AMOUNTS OF LIQUID

TECHNICAL FIELD

The invention presented here involves a process for the distribution of one or more liquid(s) contained in one or more container(s), in quantities measured by weight, in the use of which each dose is delivered with a great degree of precision, on the order of 0.5 milligrams, as well as a distribution device and a system for the distribution of one or more liquids to one or more recipient(s).

BACKGROUND ART

For a large number of activities, among which the following can be cited, without the list being restrictive: perfumes, aromas, cosmetics, fine chemistry, pharmaceutics, coloring agents, dyes and paints, food processing, wines and spirits, etc. it is necessary to make "compositions", as much in the laboratory for tests or sampling, as in production. These compositions are mixtures of liquid or solid raw materials, according to a formula in a precise dosage. The traditional manual creation of these compositions is long and can rise to many manufacturing errors. Moreover, it is difficult to achieve accuracies on the order of a half-milligram.

SUMMARY OF THE INVENTION

The invention presented here makes it possible to correct for these disadvantages for compositions of liquid raw materials. It also makes it possible to deliver precise quantities of a unique liquid into many containers.

For this purpose, the process for distribution of dosed quantities of a liquid contained in a storage container, connected to a distribution conduit equipped with a nozzle for the discharge of liquid to a container connected to a gauge component that delivers, in the form of a signal, a representative value of the quantity of liquid present in the container, where the conduit, at a distance from the nozzle, is connected to a valve component that, upon command, blocks or opens the passage of the liquid through the conduit, from the container towards the distribution nozzle. The diameter of the distribution nozzle is such that the liquid column in the portion of the conduit between the nozzle and the valve component, when the valve component is blocking the passage of liquid, can be immobilized there under the action, in particular, of surface tension forces. The process is characterized essentially in that it consists in the following functional steps, given in chronological order:

a)—open the passage of liquid between the container and the nozzle by acting on the valve component, in a manner such that the liquid can fill the portion of the conduit between the valve component and the distribution nozzle, b)—block the passage of liquid by acting on the valve component, in order to cut off the flow of the liquid, c)—apply on the liquid column, located between the valve component and the distribution nozzle, at least one mechanical impulse having a calibrated amplitude and/or intensity, in order to expel a micro-quantity of liquid from the liquid column, through the distribution nozzle, towards the container, d)—compare the value given by the gauge component to a pre-set reference value $C_1$, representative of the value of the dose to be delivered, a tolerance value $\Delta C_1$ associated with the value $C_1$, e) and to repeat the steps c) and d) if the value given by the gauge component is not contained in the tolerance range associated with the reference value $C_1$.

According to the preferred embodiment form, the gauge component gives a signal representing the weight of the quantity of liquid in the container.

It is necessary to be able to distribute in the container a relatively sizable quantity of liquid while maintaining a precision on the order of a half-milligram. Thus, according to another characteristic of the process according to the invention, during the step a), during which the passage of the liquid between the container and the nozzle is opened and the liquid is also discharged into the container, the value given by the gauge component is continuously compared to a reference value $C_0$, less than the reference value $C_1$, and close to this reference value $C_1$, and the step b) of the process is begun when the value given by the gauge component is equal to the reference value $C_0$, the steps c), d) and e) then being started successively.

This device makes it possible to ensure both the speed of the dosage and its precision.

According to another characteristic of the invention, the mechanical impulses that must be communicated to the liquid column are applied via the conduit.

According to another characteristic of the invention, the mechanical impulses that must be communicated to the liquid column are applied directly to the liquid column.

The invention also has the object of a distribution device for the delivery of a liquid in dosed quantities, characterized in that it consists of:

a storage container containing the liquid to be distributed, a distribution conduit connected to the container and provided with a nozzle for the discharge of the liquid towards a container connected to a gauge component that delivers, in the form of a signal, a value representing the quantity of the liquid present in the container, a valve component connected to the conduit and placed at a distance from the nozzle, blocking or opening upon command the passage of liquid between the container and the nozzle, the area of the section of passage that determines the nozzle being such that when the valve component blocks the passage, the liquid column present in the portion of the conduit between the nozzle and the valve component is immobilized in this portion, under the notable effect of surface tension forces, an impulse mechanism, located between the valve component and the nozzle for the deliverance of the liquid, in order to communicate to the liquid located between the valve component and the distribution nozzle, at least one mechanically calibrated impulse, under the effect of which a micro-quantity of liquid is expelled from the liquid column.

According to one of the embodiment forms, the distribution device consists of a rigid structure consisting of a first drill hole that goes all the way through, into which the conduit enters with a functionally reduced play, this rigid structure consisting of a second drill hole, is preferably straight, opening up on the one side, into the first drill hole that goes all the way through, and on the other side, on one of the sides of the rigid structure, the second drill hole receiving the pulse mechanism. According to this embodiment form, the pulse mechanism acts on the conduit and this conduit, according to another aspect of the invention, is elastically deformable at least in the first drill hole of the rigid structure.

According to another characteristic of the invention, the pulse mechanism consists of a pushrod that can be moved crosswise relative to the conduit and mounted to slide in the second drill hole at least by its front part, in order to make it possible to act by the free end of the front part, by pushing on the conduit This pushrod can be manually maneuvered, but preferably, in a manner so that the impulses communicated can be perfectly calibrated, the impulse mechanism also consists of an operating mechanism fitted to move the pushrod by a brief movement of translation towards the conduit, and this is done according to a specified and perfectly controlled amplitude and acceleration. This operating mechanism, designed to act together with the free end of the rear part of the shaft, can be integrated with the structure of the device, but according to an advantageous aspect of the invention leading to a simplification, this mechanism for operating the pushrod is external to the structure and is independent of it.

The valve component can be arranged over the portion of the conduit located between the structure and the container or even be connected to the nozzle discharge of the container, but according to an advantageous aspect of the invention, the structure of the distributor device, upstream from the second drill hole considering the direction of flow of the liquid in the conduit, is provided with a third drill hole, preferably straight, opening on the one side into the first drill hole that goes through and on the other side, on one of the sides of the rigid structure, the third drill hole receiving the valve component.

According to another characteristic of the invention, the valve component consists of a mounted shaft, at least with its front part in the third drill hole, coming into blocking position with the open end of its front part pinching the soft conduit. The internal passage of the conduit thus becomes blocked by the flattening of the wall of the conduit on itself.

The operation of the shaft can be done manually, but preferably according to another aspect of the invention, the valve component consists of a mechanism for operating the shaft designed to cooperate with the rear part of this shaft, this operating mechanism being preferably outside of the rigid structure.

Preferably, according to another aspect of the invention, the shaft is threaded and the third drill hole is tapped in order to receive the shaft when it is screwed in. In screwing the shaft for adjustment of the degree of recess of the shaft in the tapped hole and in the conduit, it is possible to adjust the degree of throttling of the conduit by the shaft, and thus the section of the passage at the level of the valve component, and as a result, the flow rate of the liquid.

For its manipulation by the operating mechanism, the shaft, along the open end of its rear part, is equipped with a keyway, which acts together with the formed fitting and the torque transmission and the rotating movement, the drive endpiece in rotational, motorized drive with the operating mechanism. According to a preferred embodiment form, the operating mechanism of the shaft of the valve component is equipped with a drive instrument at the output shaft of which the drive endpiece is coupled.

In the embodiment form described above, the impulse mechanism and the valve component act on the wall of the conduit.

According to another embodiment form, the distribution device according to the invention is remarkable notably in that the conduit consists of an upstream section connected to the storage container and a downstream section having an open end from which the distribution nozzle is formed and that the valve component is a slide valve of a normally closed type, to which is connected on one side the upstream section of the conduit and on the other side, the downstream section of the conduit, the aforementioned valve consisting of a valve body in which a housing is formed that consists of an upstream section and a downstream section which are in communication with each other via an intermediate section having a cylindrical form, at the opening of which, in the upstream part of the housing, a valve seat is formed, against which a valve that is mounted so that it is mobile in the upstream part of the housing, can rest in a blocking position. This upstream part of the housing is in contact with the upstream section of the conduit by a drill hole formed in the valve body. The downstream section of the conduit is in turn in contact with the intermediate part of the housing through a second drill hole formed in the valve body. The valve body is provided with a third drill hole that passes through it along an axis perpendicular to the valve seat and opening into the downstream part of the housing, where in this drill hole a shaft for operating the valve is placed. The shaft is connected to an operating mechanism and the valve is connected to an impulse mechanism.

According to another characteristic of the invention, the material constituting the seat has a greater hardness than that of the constituent material of the valve seat. This makes it possible to perform the automatic run-in of the valve seat and to improve impermeability.

According to another characteristic of the invention, an aspiration mechanism is provided to bring back, by aspiration into the upstream part of the conduit, the drops of liquid present at the level of the distribution nozzle and in particular, before the application of impulses on a liquid column. This device, in preventing the liquid drops from falling inadvertently into the container, guarantees dosages that are precise and can be reproduced with the same degree of precision.

In the preferred embodiment form, the aspiration mechanism consists of a piston mounted in a cylinder bore made in the valve body. The cylinder bore being in communication with the upstream part of the housing and the piston being connected to an operating mechanism. Advantageously, according to another aspect of the invention, the piston and the operating mechanism constitute the impulse mechanism.

According to a particularly advantageous embodiment form, the piston is formed around the activation shaft of the valve and is fixed to this shaft; the operating mechanism of the piston constitutes the operating mechanism of the shaft; the shaft and the valve are not bound to each other and the shaft is mobilized by its operating mechanism in a resting position such that it is isolated from the valve in one of its operating positions where, in operating by pushing on the valve, it supports this valve in isolation from its seat, the value of the isolation between the valve and the seat is thus the value of the flow rate of the liquid, depending on the operating position obtained by the operating shaft.

Thus, in selecting the operating position that the shaft must reach, and in controlling this position, it is possible to select the value of the flow rate of the liquid across the slide valve and to perfectly control this value.

According to another characteristic of the invention, the operating mechanism of the impulse and actuation mechanism of the valve component consists of a cam and of a driving instrument for driving the cam, this cam being fixed on the rotating output shaft of the drive instrument.

The invention presented here also has as an object, a system for delivering in an automatic manner, precise quantities of one or more liquids to one or more container(s) characterized essentially in that it is equipped with at least one distribution device as previously defined.

According to another characteristic, the system according to the invention consists of a first support assembly on which are mounted several distribution devices and a second support assembly, on which the driving instrument(s) of the operating mechanisms is or are mounted, the aforementioned system consisting of more or less one container for liquid(s), at least one gauge component showing the quantity of liquid in this container, this component is fitted to emit a signal representative of this quantity to another programmable unit for the calculation and control, according to the data of a pre-set program, of the drive instrument(s) of the operating mechanism(s) of the valve component and the impulse mechanism of each distribution device.

According to another characteristic of the invention, the support assemblies are mobile relative to each other and at least one of the two support assemblies is mobilized relative to the other by a driving instrument controlled by a control and command unit in order to be positioned relative to each other, the driving instrument(s), and the operating shafts of the selected distribution device.

BRIEF DESCRIPTION OF THE DRAWINGS

Other advantages, goals and characteristics of the invention appear in reading the description of a preferred embodiment form, given as an guideline example, in referring to the attached drawings in which.

DETAILED DESCRIPTION OF THE INVENTION

Figure 1:
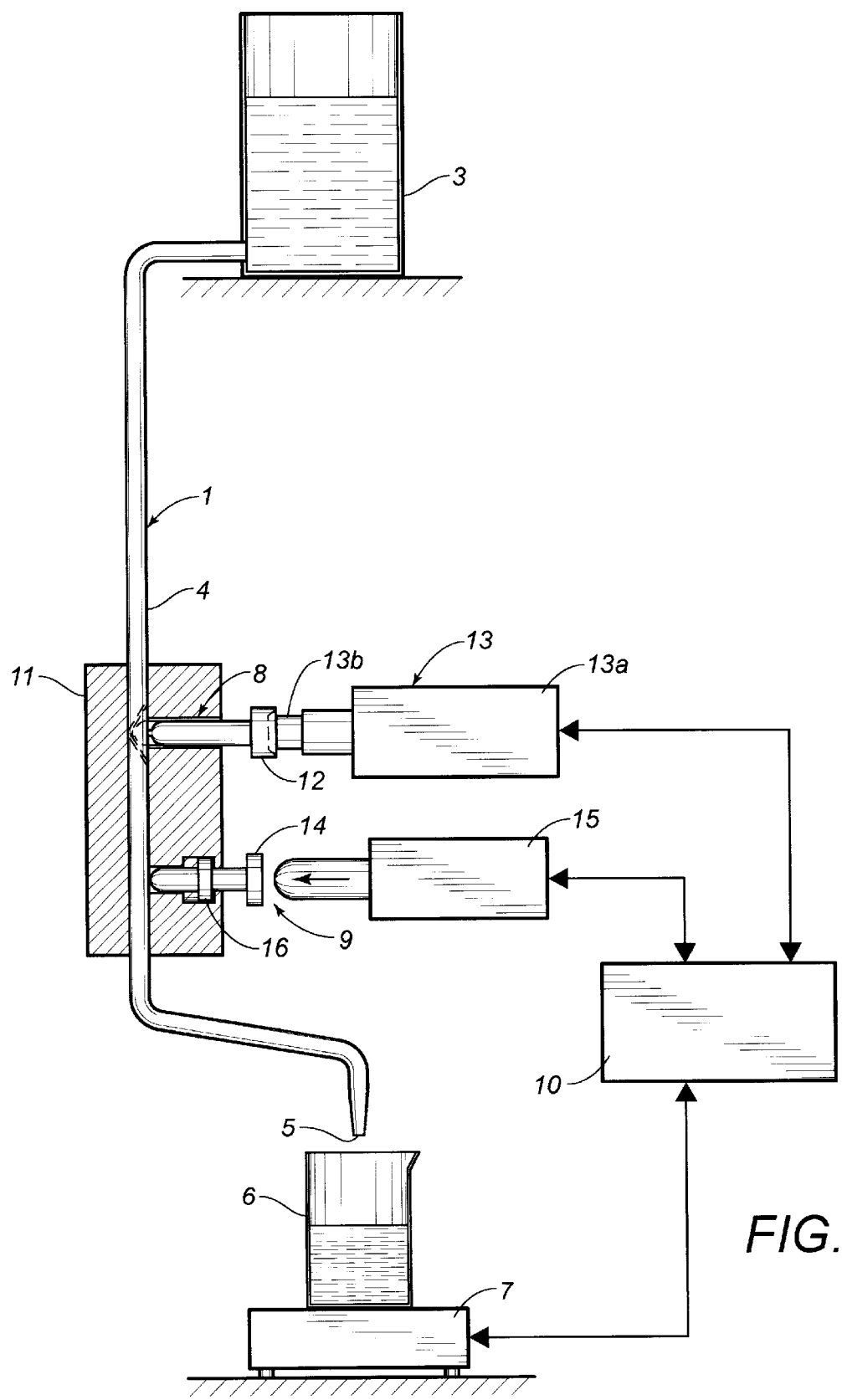
FIG. 1 is a longitudinal sectional view of a distribution device according to a first embodiment form.

As shown in the distribution device 1, 2 according to the invention, a storage container 3 contains liquid to be distributed in dosed quantities, consisting of a nozzle for discharging a liquid, to which a distribution conduit 4 is attached in any known way. The distribution conduit 4 is provided at its free end with a nozzle 5 for the discharge of the liquid to a container 6 connected to a gauge component 7 which transmits in the form of a signal, a representative value of the quantity of liquid present in the container 6. The distribution device consists of, in addition, a valve component 8 connected to the conduit and placed at a distance from the nozzle 5, blocking or opening the passage of liquid into the conduit between the container 3 and the nozzle 5 on command. This nozzle, having a circular form, determines a circular passage section whose clearance area value is equal to or less than the value necessary in order to ensure that when the valve component is in position blocking the passage liquid, the immobilization of the liquid column in the portion of the conduit includes between the nozzle and the valve component. This immobilization is essentially due to the surface tension forces. The diameter of the nozzle will be a function of the physical characteristics of the liquid to be distributed and thus notably a function of its viscosity. Between the valve component and the nozzle for discharging the liquid, the distribution device is equipped with an impulse mechanism 9 in order to communicate to the liquid column located between the valve component 8 and the distribution nozzle 5, at least one mechanical impulse calibrated under the effect of which a micro-quantity of liquid is expelled from the liquid column. This impulse mechanism is only activated after the closing of the section of the liquid passage by the valve component 8. For a dosage of a determined quantity of liquid, the functioning of the device is the following: the valve component 8 is placed first in the open position of the internal passage of the conduit in a manner so that the liquid can flow from the container 3 to the container 6. The quantity of liquid required being reached to within a drop or a fraction of a drop, and the valve being placed in the blocking position of the internal passage of the conduit, the shocks or impulses, transmitted by the impulse mechanism 9 directly or indirectly to the liquid column contained between the valve component 8 and the nozzle 5, make it possible to expel micro-quantities of the liquid contained in this column. As a function of the liquid viscosity, of the size of the discharge nozzle 5, and of the impulse energy, the quantity delivered by these impacts can be precisely determined, and in a repeatable manner by calibration. Thus, the quantity required can be precisely obtained.

The liquid container 3, the valve component 8, the impulse mechanism 9, the gauge component 7 and the container 6 are carried by the appropriate supports.

The container 3 for liquid storage, of a known type, can be located at a distance from the valve component or even near to it. This container will be provided with a cover for blocking and protecting the internal volume that it contains. This container can be placed to a higher height level with regard to the one of the valve component 8 to allow a gravitational flow of liquid or even at a level lower in connection with a mechanism for propulsion of the liquid towards the valve component 8. This mechanism can consist of a volume of compressed gas introduced in the upper part of the container in order to exert a pressure on the liquid contents. In the case of the drawing, the cover will ensure a perfect impermeable closing and will be provided with a drill hole that goes through, in which will be fixed a connection nozzle of a conduit connected to a source of gas under pressure. This gas is to be selected in a manner such that a chemical reaction can not occur with the liquid contained in the container.

The gauge component 7, according to the preferred embodiment form, is of the type of those that are fitted to transmit a signal representing a weight value. The gauge component will be or will consist of a weight sensor placed under the container to give a signal representing the weight value of the container and the quantity of liquid contained in the container. Judiciously, the signal emitted will be an electric signal of the analog or digital type in order to allow the treatment of the signal by a command and control unit 10 that can be connected to distribution device 1, 2 in order to command and control the functioning according to the instructions of a pre-set program based on the user's requirements. The gauge component 7 in the preferred embodiment form is a precision scale suited to produce the signal mentioned above and to transmit it to the command and control unit 10 to which it is connected by an appropriate electrical line. This precision scale can be provided with a display component in a form understandable to the user, having the weight value of the liquid introduced into the container. This scale will be provided with a horizontal support on which the container will rest for the purpose of measuring the weight of the liquid contained in it.

As a variation, the gauge component will be one of the type of those fitted to directly deliver a signal representing the height of the liquid in the container then convertible by the unit 10 into the weight value or volumetric value.

In FIG. 1, a distribution device according to a first embodiment form.

This device consists of a rigid structure 11, having a parallelepiped shape, attached to an appropriate support. This structure consists of, between its two horizontal upper and lower sides, a first drill hole going through, vertically, having a diameter that is equal to or slightly greater than that of the conduit. The conduit 4 is placed in the drill hole and the drill hole preferably only covers a part of the length of the conduit. The rigid structure 11 is preferably located at a distance from the two ends of the conduit. The wall of the part of the conduit located in the first drill hole is elastically deformable. For reasons of simplification of the embodiment, the assembly of the conduit 4 is made of an elastically deformable material but you could provide a conduit in three sections joined by an impermeable material. The two lateral sections could be made of a rigid material, for example, of metal while the middle section, the section to be placed in the first drill hole, could be made in an elastically deformable material.

Thus the part of the conduit housed in the vertical drill hole can deform onto itself, under the action of outside forces, in a non-permanent manner, this deformation being done against internal elastic forces due to the natural elasticity of the material constituting its wall. When these forces are removed, the conduit can resume its initial shape because of these internal elastic forces. The dynamic pressure of the liquid exerted on the inner side of the conduit also contributes to returning the conduit to its initial shape.

According to the preferred embodiment, the material used to create the conduit 4 has a base of tetrafluoroethylene as is known under the commercial name "TEFLON", because of the resistance of this material to chemical agents and to corrosion.

Perpendicularly to the first drill hole and in a secant manner to it, the structure of the lower part consists of a second drill hole and in an upper part, of a third drill hole. These second and third horizontal drill holes, opening on one side into the first drill hole and on the other side on a same small lateral vertical side of the structure. In the upper drill hole, the valve component is placed while in the lower drill hole, the impulse mechanism is placed.

The valve component consists of a shaft 12 mounted at least by its front part in the third drill hole. This shaft, in blocking position, by the free end of its front part, comes to pinch the flexible conduit and flatten the wall of this conduit onto itself, which leads to blocking the internal passage of the liquid The end of the front part of the shaft 12 is rounded in order to prevent damaging the conduit. In the preferred embodiment form at least the lower part of the shaft is threaded and the upper drill hole, along all of its length, is tapped in order to receive the threaded front part of the shaft 12 when it is screwed in. The rear part of the shaft 12, outside of the rigid structure 11, is provided with a head 13, which when manipulated, allows the adjustment of the degree of recess of the free end of the rear part of the shaft 12 in the conduit 4. Thus, by this arrangement, between a position of full opening in which the conduit 4 is not deformed by the shaft and a position of complete closing, in which the wall of the conduit is flattened on itself by the shaft, it is possible to pull in and to support the free end of the front part of the shaft in an intermediate position according to the desired degree of throttling and thus the flow rate of the liquid obtained.

At the level of the valve component, the continuous opening of the inner section of the passage, by unscrewing the shaft 12, makes it possible to vary the flow rate in a continuous manner, from a drop-by-drop very slow, to a maximum flow rate, which is a function of the section of the conduit and that of the nozzle 5, of the liquid viscosity, and of the difference of the height between the level of the liquid in the container and the output nozzle or even of the value of the excess pressure in the container, in the case where this container receives a compressed gas in order to propel the liquid.

The head, which forms an annular swelling on the shaft, allows the manual manipulation of the shaft. In addition, the head of the shaft can form a stop for the progression of the shaft in the coming conduit, in a completely closed position, against the rigid structure 11.

Thus, in this position, the shaft will not be able to penetrate any further into the wall of the conduit which eliminates the risks of the perforation of this wall.

According to a preferred embodiment form, the valve component also contains a mechanism 13 for an automated activation of the aforementioned shaft 12. This mechanism 13 is outside of the rigid structure 11 and contains a drive instrument 13a, for example, a step-by-step electric motor, at the output shaft of which a male drive endpiece 13b is coupled which acts together by interlocking of shape and transmission of the couple and the rotational movement with a keyway engraved on the free end of the rear part of the shaft 12 in the axis of the shaft. The drive instrument 13a will be driven by the control and command unit 10 and for this purpose, will be connected by a suitable electric line to the unit.

As mentioned above, the horizontal lower drill hole receives the impulse mechanism 9. This impulse mechanism contains a pushrod 14 mounted to slide in the lower drill hole in order to be able to act by pushing radially on the conduit and in this way to communicate a mechanical impulse to the liquid column. The impulse mechanism contains, in addition, outside of the rigid structure 11, an operating mechanism 15 fitted to move the pushrod 14 along a brief translational movement towards the conduit 4. The pushrod 14 is mounted by its rear part in the lower drill hole and by its rear part comes outside of the rigid structure 11. The free end of the front part is rounded in a manner to eliminate any risk of perforation of the conduit under the action of the impulses received. In addition, the amplitude of the path of the pushrod is limited to a value lower than the diameter of the inside passage of the conduit in a manner so that the pushrod can not crush the conduit 4; this value can also be less than that of the radius of this passage.

In order to limit the amplitude of its path, the pushrod 14 contains, between its front part and its rear part, a flanged form 16 that forms a stop and is placed with this flanged form in a countersinking formed in the rear part of the drill hole. The flanged form 16, coming to stop against the countersunk base, limits the movement of the drive of the pushrod in the conduit 4.

Here it is noted that the internal elastic forces on the part of the conduit housed in the vertical drill hole are sufficiently sizable in order to push back the pushrod 14 towards its initial position when the impulse has stopped. However, if need be, an elastic return movement instrument, in the form of a spring having non-abutting spirals, can be placed under tension between the flanged form and the countersunk base.

In the preferred embodiment form, the operating mechanism 15 is made of a drive instrument of the pneumatic or hydraulic valve type, arranged by its shaft relative to the pushrod 14 in axial alignment with the pushrod. This valve, single or double action, is connected to a source of liquid under pressure (air or oil depending on the valve type), through a solenoid valve piloted by the command and control unit 10. For this purpose, this solenoid valve is connected to the unit 10 by an appropriate electric line. This valve 15 is mounted on an appropriate support. By the end of its shaft, this valve when it is activated in the direction of the movement out of the shaft, will communicate to the pushrod a mechanical impulse axial, under the action of which this pushrod can be displaced by sliding in the lower drill hole and comes to act by pushing radially on the conduit. Immediately afterwards, the valve is activated in the direction of retraction of its shaft. The shaft of the valve can be fixed to the pushrod by a sleeve tube or an articulation but preferably these two components are not connected to each other.

As a variation, the operating mechanism can be made of a cam in the form of an eccentric, and by a drive instrument having a rotating output shaft to which the cam is coupled. This motor, which can be a step-by-step electric motor will be positioned on a fitted support of the type having its output shaft vertical and having the cam in the form of an eccentric positioned relative to free end of the rear part of the pushrod 14. The cam is, in the form of a thick, circular disk, provided along its depth with a drill hole passing through, set eccentrically, by which it will be mounted in fixed attachment on the output shaft of the motor. By its cylindrical surface, in the process of rotation, the cam comes to act by pushing on the pushrod 14. The drive instrument will be operated by the command and control unit 10 and will be connected to this unit by a suitable electrical line.

Figure 2:
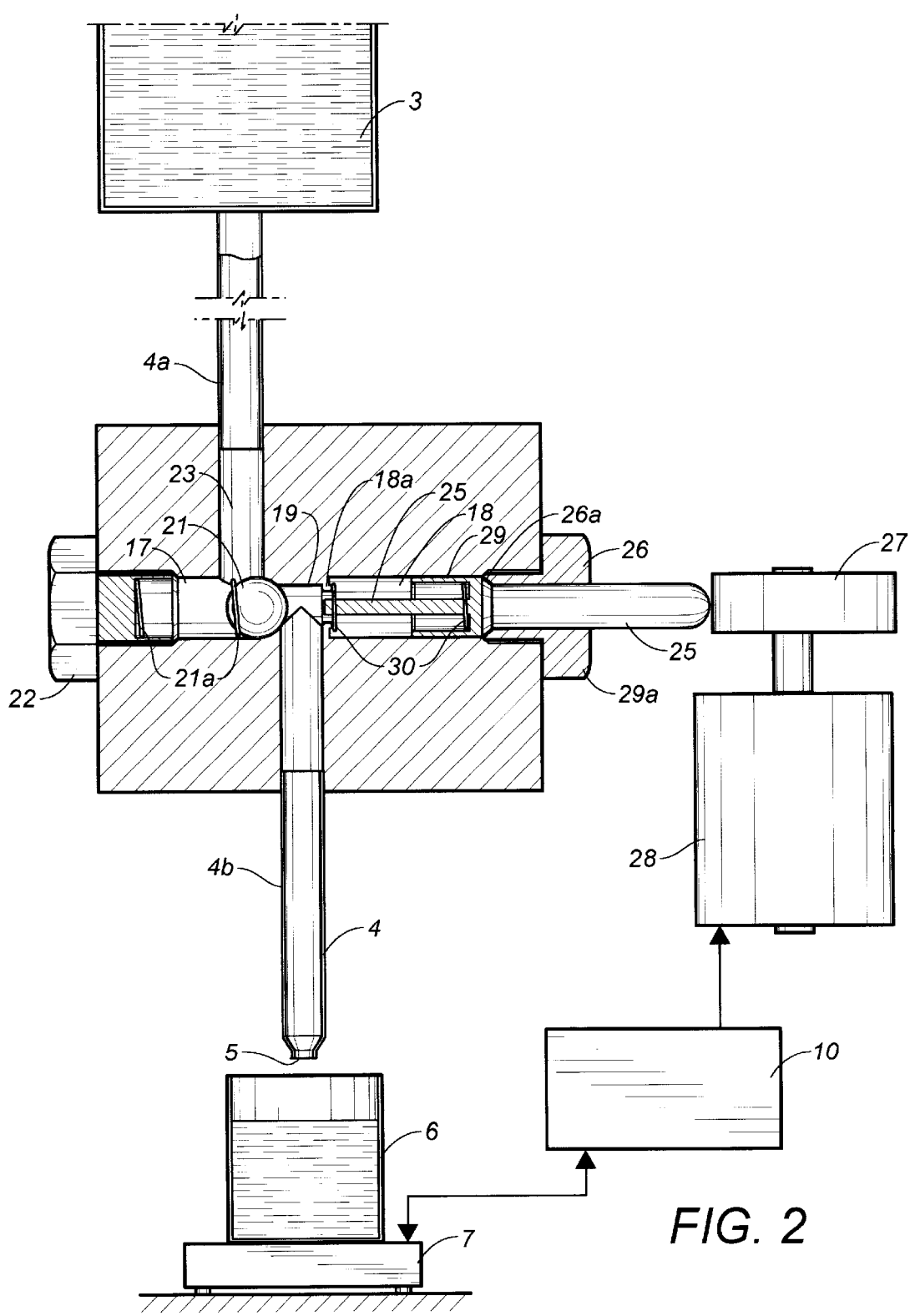
FIG. 2 is a longitudinal sectional view of a distribution device according to a second embodiment form.

In FIG. 2, a distribution device 2 is shown according to a second embodiment form.

According to this embodiment form, the conduit 4 has an upstream section 4a connected to the storage container 3 and a downstream section 4b on the free end of which the distribution nozzle 5 is formed. The valve component 8 consists of a slide valve of the normally closed type to which, on one side the upstream section 4a of the conduit is connected, and on the other side, the downstream section 4b of the conduit is connected.

The valve component consists of a valve body in a parallelepiped form, made of a material that is low in its susceptibility to corrosion and suited to resist chemical agents A stainless steel can be used or preferably a synthetic material based on tetrafluoroethylene such as is known under the commercial name "TEFLON".

In the body of the valve, a horizontal, cylindrical housing that goes through it is formed, consisting of an upstream part 17 and a downstream part 18 each in communication with each other by an intermediate part 19 having a cylindrical form, at the opening of which, in the upstream part 17 of the housing, a seat 20 of the valve is formed. The upstream part of the housing is blocked in an impermeable manner by a stopper 22. This stopper consists of a head extended axially by a threaded cylindrical part placed so that it screws into a female threading formed in the cylindrical part upstream 17 from the housing. By the head, the stopper is moved under pressure towards the side corresponding to the body of the valve.

Against the seat 20 of the valve, a valve 21, that is mounted so that it can move in the upstream part 17 of the cylindrical housing, rests in the blocking position. Advantageously, the valve is made up of a ball made of stainless steel having a polished surface. This ball has a diameter that is slightly less than the diameter of the upstream part 17 of the housing in order to be able to slide freely in the housing while being perfectly guided. To the valve 21, is joined an elastic instrument for return-movement 21a which fixes its bearing against the seat 20 in blocking position of the valve. This elastic instrument for return-movement 21a consists of a spring having non-abutting spirals, mounted in the upstream part 17, under tension between the blocking ball 21 and the stopper 22.

The upstream part 17, by a drill hole 23 made in the valve body perpendicularly to the drill hole passing through, is connected to the upstream section 4a of the conduit, this conduit being placed by force into the drill hole 23 while the downstream section 4b of the conduit is itself connected to the intermediate part 19 of the housing through a second drill hole 24 made in the valve body, in a manner perpendicular to the drill hole going through. The section upstream from the conduit will be placed by force into the drill hole 4b.

The opening of the drill hole 23, in the upstream part 17, is positioned so that it is only partially blocked by the ball when the ball is resting on its seat. By this arrangement, the pressure of the liquid in the upstream part 17, when the valve is in the blocking position, ensures, in combination with the spring 21a, the support of the ball against its seat. In addition, this arrangement ensures the communication of the drill hole 23 with the intermediate part 19 of the housing and this as soon as the ball 21 is lifted off its seat 20.

The valve body, along an axis perpendicular to the seat of the valve, in the axis of the drill hole passing through, is provided with a drill hole passing through, opening into the downstream part of the housing, in which a cylindrical shaft 25 engages for operating the valve 21. According to a preferred embodiment form, this drill hole passing through is made in a blocking stopper 26 placed by screwing into a threaded cylindrical part that it contains in a female threading made in the downstream part 18 of the housing. This blocking stopper 26 contains a head by which it is moved under pressure against the lateral side corresponding to the valve body. Some impermeable seals in a toroidal shape are arranged around the shaft, in the drill hole passing through the stopper.

Outside of the valve body, the shaft 25 acts together with an operating mechanism made up of, for example, a cam 27 in the form of an eccentric and by a drive mechanism 28 for driving the cam, having a rotating output shaft on which the cam 27 is supported. The motor 28 which can be a step-by-step electric motor is positioned on a fitted support of the type such that its output shaft is vertical and that the cam 27 is positioned relative to the free end of the rear part of the shaft 25. The cam, in the case of a vertical configuration of the output shaft of the motor, has in the form of a thick circular disc, provided along its depth, a drill hole going through it eccentrically, by which it is mounted in fixed attachment to the output shaft of the motor 27. By its cylindrical surface, during its rotation, the can comes to act by pushing on the shaft 25 in a manner so as to lift the valve from its seat against the action exerted by the elastic mechanism 21a. The shape of the cam ensures the continuity of the opening of the valve and thus the continuous variation of the flow rate of the liquid and this is done from a drop-by-drop very slowly, to a maximum flow rate. In addition, in order to assure the bearing of the cam in a fixed angular position, it is possible to regulate the level of the flow rate of the liquid through the valve and to maintain this flow rate constant.

As a variation, the motor will be positioned such that its output shaft is horizontal. In this configuration, the cam has a cam surface that expands in an oblique manner relative to the axis of rotation.

The drive instrument will be controlled by the command and control unit 10 and will be connected to this unit by a suitable electric line.

It is noted here that when there is a power cutoff, the return-movement spring 21a is sufficiently powerful to push back the assembly made up of the valve, the shaft 25 and the cam, and to move the valve to its seat. Thus, a power cutoff of the drive instrument turns into a closing of the valve.

Connected to this device is an aspiration mechanism for moving the liquid drops present at the level of the distribution nozzle 5 by aspiration in the upstream part of the conduit 4b, and this is notably done before the application of the impulses on the column of liquid. According to the preferred embodiment form, this aspiration mechanism consists of a piston 29 formed around the actuation shaft 25 and attached to the shaft. This piston is mounted to slide in the downstream part 18, where this part 18 is bored. In this embodiment form, the actuation shaft 25 is not fixed to the valve and an elastic instrument 30 is planned for moving back, as soon as the valve has returned to its seat, of the shaft and the piston to a resting position, i.e. the position the furthest from the seat of the valve. According to this position, the shaft 25 is removed from the valve. In the resting position, the piston 29, by a conical door 29a that it has in its rear part, comes to support against a conical seat 26a arranged in the stopper 26 around the drill hole passing through. This arrangement promotes impermeability of the assembly. The elastic instrument 30 is mounted in the downstream part (18) of the housing, under tension between the piston (29) and a shoulder (19a) formed between the part (18) and the intermediate part (19). The return movement of the shaft and the piston is done continuously during the return of the cam to an initial angular position where it no longer acts on the shaft 25. During this return movement to the resting position, the valve being support on its seat, the volume of the encapsulation formed in front of the piston increases continuously and the liquid contained in the section of the conduit 4b is aspired to the part 19 of the housing and towards the upstream part 18. Thus, the liquid drops present at the level of the nozzle 5 are brought back into the section of the conduit 4b.

In this embodiment form, the piston 29 and the actuation mechanism of the shaft of the valve consisting of the impulse mechanism 9, it is noted that the maximum amplitude value of the movement of the shaft, when the impulses are communicated by the piston to the column of liquid present in the conduit section 4b is less than the value of the difference between the shaft and the valve 21, measured when the valve is resting on its seat and the shaft is in the resting position. Thus, during the application of the impulses on the liquid column, the shaft can not come into contact with the valve 21 which eliminates risks of opening the valve unexpectedly during micro-dosage.

It is noted here that the mechanism which is being described presents two zones to know one zone of elevated pressure concerning section 4a of the conduit, the drill hole 23 and the upper part 17 of the housing and a lower pressure zone involving the section of the conduit 4b, the intermediate part 19 of the housing, and the downstream part 18 of the housing. It is noted also that the impermeability of this assembly is primarily ensured in the lowest pressure zone, which is a notable advantage for the reliability of the device.

The container 3 of this device can be placed at a distance from the valve body or even immediately adjacent to the valve body, in order to reduce the length of the conduit section and thus the size of the storage volumes. This device is notably applied when the liquid is costly and/or when it must be distributed in a very low quantity. The container 3 can also be directly fitted in the drill hole 23 by its nozzle.

The distribution device 2 as has been described can be used in a large number of applications from micro-dosage in the laboratory to the dosage of large quantities of liquid. For production applications, the size of section 4a, 4b of the conduit can reach without difficulty diameters of 50 mm, or even more. The size of the valve will of course be proportional to the size of the conduit.

In FIGS. 3 to 7, various embodiment forms of a system provided with at least one distribution device 1, 2 are shown, as have been described above. This system is designed to deliver in an automatic manner, precise quantities of one or more liquids to one or more container(s) 6 in order to form, for example, mixtures of various liquid products.

The installation consists of a first assembly support 31 on which several distribution devices 1, 2 are mounted and a second assembly support on which the drive instrument(s) 13a, 15, 27, 28 of the actuation mechanisms is or are mounted. Connected to this system are at least one container 6 of liquid(s), at least one gauge component 7 of the quantity of liquid in the container 3, which is fitted to transmit a signal that is representative of this quantity to the calculation and command unit 10, programmably fitted to command and control according to the data of its program, the drive instrument(s) of the actuation mechanism(s) of the valve component and of the impulse mechanism of each distribution device.

According to a first embodiment form, the support assemblies 31, 32 are mobile relative to each other and at least one of the two support assemblies is mobilized relative to the other by a drive instrument controlled by the calculation and command unit 10 in order to be positioned in relation to the other ones, the drive instruments of the actuation mechanisms and the actuation shaft(s) of the distributor device selected.

Always depending on the preferred embodiment form, the distribution devices 1, 2 are placed on the first assembly support 31 at a constant interval along a circle circumference and in a radial manner relative to the circle circumference in a manner so as to form a crown. As a variation, these devices can be placed at a constant interval along a straight line or even along a curve if the geometrical restrictions of the implantation and installation site require such a configuration. With a configuration in a straight line, the second assembly support will be movable and will be constituted by a shifted carriage so much in height as to be parallel to the alignment formed by the distribution devices. The movements of this carriage with respect to the distribution devices, as well as its position relative to the distributor selected are steered and controlled by the command and control unit 10.

The distribution devices could also be arranged at a non-constant interval from each other.

Figure 3:
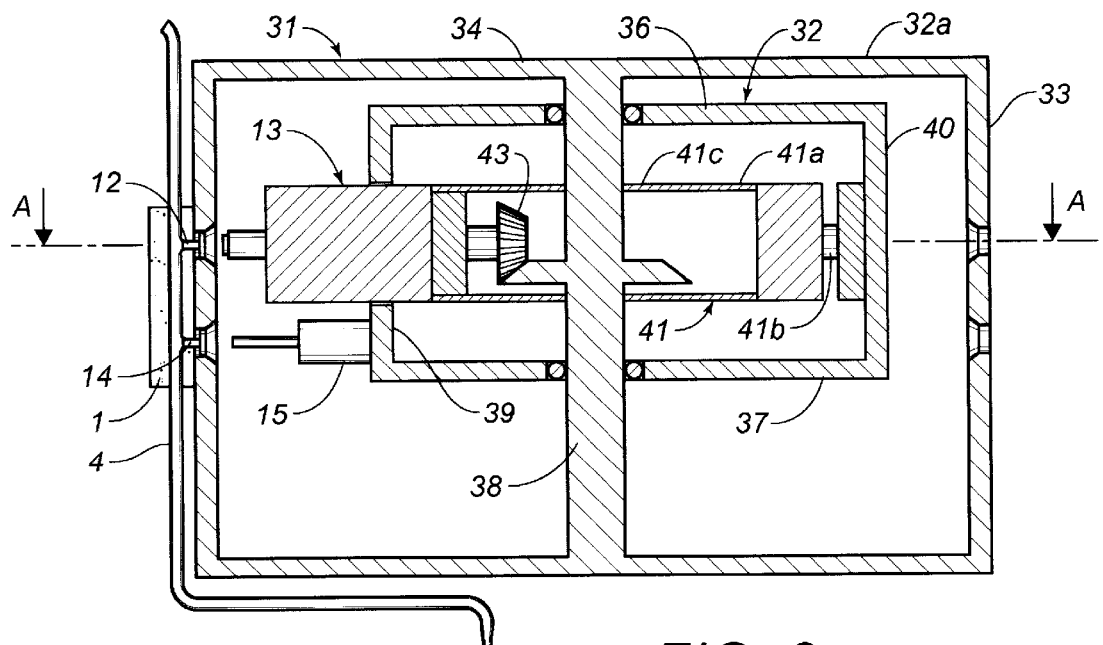
FIG. 3 is a sectional view, according to a vertical plane, of a system equipped with distribution devices according to the preferred embodiment form.
Figure 4:
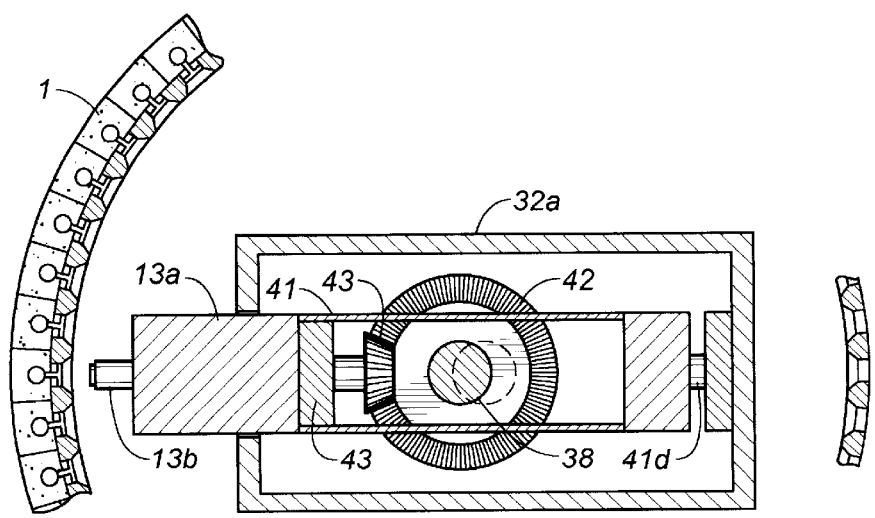
FIG. 4 is a sectional view along the line AA of FIG. 3.
Figure 5:
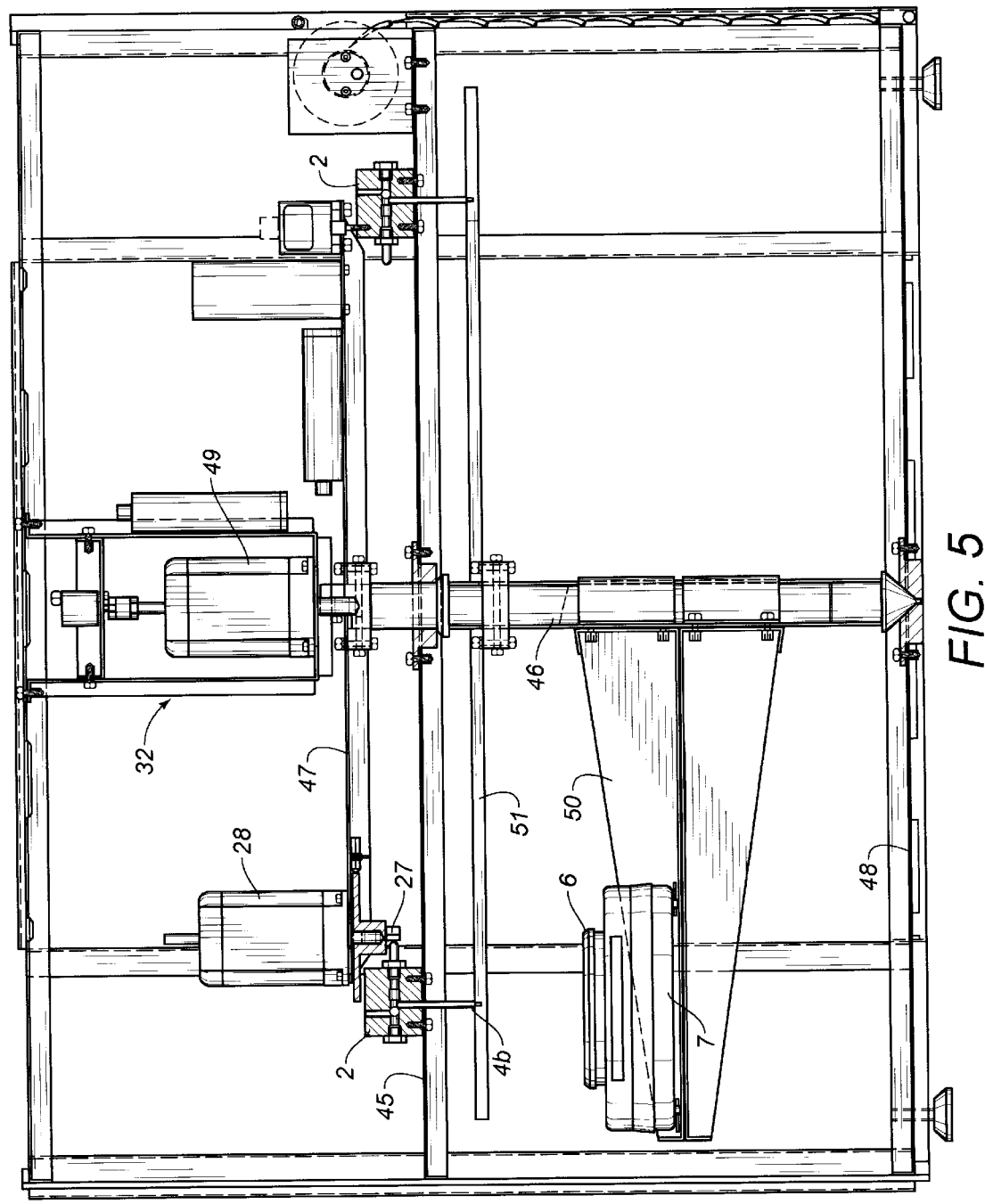
FIG. 5 is a sectional view along a vertical plane, of a system equipped with the distribution devices according to the second embodiment form.

In the embodiment forms shown in FIGS. 3 to 5, the second assembly support 32 is arranged in the first one and the shaft(s) 12, 14, 25 of the actuation mechanism(s) of each distribution component 1, 2 is or are horizontal and radial to the crown formed by the distribution devices.

Preferably, the first assembly support 31 is fixed and the second is mobilized by the drive instrument. You could, however, provide an inverse device i.e. a second fixed assembly support and a first assembly support that is mobile and activated by the drive instrument.

In FIGS. 3 and 4, a system equipped with the distribution device 1 according to the first embodiment form is shown. The first assembly support 31 consists of a continuous wall 33, defining a cylindrical volume in which the second assembly support 32 is housed. This continuous wall receives an upper wall 34 in the form of the circular disk and a lower wall 35 in the form of a circular disk. These upper and lower walls block partly above and partly below the cylindrical volume which delimits the continuous wall 33. The enclosure formed by the walls 33, 34, and 35 is supported by a suitable underframe, not shown. On the outside cylindrical side of the continuous wall 33, attached by any mechanism known to the professional, is the rigid structure 11 of each distributor device 1 equipping the system. At the level of each distributor device 1, the continuous wall 33 is equipped with two drill holes that go through it radially. In one of these drill holes, the shaft 12 of the valve component 8 is placed and in the other one, the pushrod 14 of the impulse mechanism 9.

The second assembly support 32 consists of an enclosure 32a forming a parallelepiped caisson, provided with an upper horizontal wall 36 and a lower horizontal wall 37 each equipped along a vertical common axis with a drill hole going through, in which a rotational guide bearing is mounted on a vertical shaft 38 that forms a single piece with the first assembly support 31, and more precisely, with the walls 33 and 34 of the assembly support 31. This caisson is arranged in a manner centered relative to the crown formed by the distributor devices 1. The two upper and lower walls 37, 38 are joined to each other by at least two lateral walls 39, 40, diametrically opposed, perpendicular to a same axis secant and perpendicular to the longitudinal axis of the guide shaft 38. The first of these walls, the wall 39, along a horizontal axis radial to the guide shaft 38 and radial to the first assembly 31, is equipped with a drill hole passing through in which a collar is placed that is provided with a bore going through the right polygonal section and expanding along a radial horizontal axis to the guide shaft and radially to the crown formed by the distribution devices. In this bore, a sheath 41 is placed, parallelepiped in shape, that makes up a case having upper 41a and lower 41b walls, each one provided relative to the other with an opening 41c going through the passage of the vertical guide shaft 38. This shaft receives by attachment, in the sheath 41, a fixed toothed crown 42 with which it is designed to act together in engaging a toothed pinion 43 supported on the horizontal output shaft of a drive instrument for driving in rotation the second assembly support 32 around the guide shaft 38. This drive instrument is a single piece with the sheath and is fixed in front of this sheath by any mechanism known to the professional. This drive instrument consists for example of a step-by-step electric motor controlled by the command and control unit 10.

Advantageously, this drive instrument is made of the drive instrument 13a of the actuation mechanism 13. For this purpose, this motor contains a shaft that goes through in order to receive along one of its ends the pinion 43 and along the other end, outside of the enclosure, and relative to the distribution devices, the endpiece 13b for coupling to the shaft 12.

The sheath 41 carries outside of the enclosure 32a and relative to the distribution devices, the drive instrument 13a with the endpiece 13b for coupling the valve component 8 while the enclosure 32a under the actuation instrument cited above, carries the drive instrument 15 of the actuation mechanism of the impulse mechanism 9.

The drive instrument 13a for driving in rotation the second assembly support is steered by the unit 10 so as to displace the actuation mechanisms towards the distribution device selected and to temporarily immobilize them in the axis of the shaft 12 and pushrod 14.

Advantageously to the axis going through the drive instrument 13a, a coder is connected, of a known type, connected by an appropriate electric line to the control and command unit in order to deliver to the control and command unit a signal representing the angular position of the second assembly in the first.

The sheath 41 is mounted to slide in the bore going through the collar, and the openings 41c going through, made in the lower and upper walls of the sheath 41 are in an oblong form and oriented in a manner so that their longitudinal axis expands in a manner radially and secant to the longitudinal axis of symmetry of the guide shaft 38. In addition, at the rear wall of the sheath and at the wall of the enclosure 32a, an activation instrument 41d is attached, of a valve type, under the action of which the sheath 41 is displaced in the bore of the collar either towards the distribution device 2 selected so that the coupling endpiece 13b that is carried by the drive instrument 13a is coupled to the shaft 12a of the valve component 8 and the pinion 43 is uncoupled from the crown 42, or in the inverse direction so that the coupling endpiece 13b is uncoupled from the shaft 12 of the valve component 8 and the pinion 43 is coupled to the toothed crown 42.

Also depending on this type of embodiment, the container 6 and the gauge component 7 of the liquid quantity in this container are fixed with respect to the first assembly support 31 and occupy a lower position coaxial with respect to the crown that forms the distribution devices 1. The conduits of these devices in the lower part are bent in a manner so as to come to be located by their discharge nozzle 5 above the container 6. It is noted that the conduit through their lower parts have equal dimensions and are bent along the same angle. This characteristic permits the improvement of the repeatability of the resulting quantities.

The system as described can also be use distribution devices 2 according to the second embodiment form.

In FIG. 5, a system is shown equipped with distribution devices 2 according to the second embodiment form.

The first assembly support 31 consists of a horizontal plate 45 carried by and in a three-dimensional structure formed by the assembly of uprights and traverses arranged according to the edges of a rectangular parallelepiped. This structure receives the fixed walls of the cover defining a parallelepiped volume in which the second assembly support is placed. This volume is provided with an access opening to which a mobile screen, a seal, or even a flap is connected. The horizontal plate 45 receives in attachment the valve body of each distribution device 2 equipping the system. As indicated previously, the valve bodies are arranged at regular interval relative to each other along the circle circumference in a manner so as to form a circular crown and are oriented so that their actuation shaft 25 is radial to the crown formed and is oriented towards the center of this crown and towards the second assembly support 32.

The second support assembly 32 consists of a vertical shaft 46 to which a support arm 47, is attached in a radial manner. The support arm 47 carries at a distance the shaft 46, the drive instrument 28 with cam 27 of the impulse mechanism 9 and actuation mechanism of the valve component 8. The arm extends on both sides of the shaft and carries, in the opposite direction of the motor component 28, a balance weight. The vertical shaft 46 is placed at its lower end in a guide plate in rotation, fixed to a lower plate 48 that is in one single piece with the first support component 31 and is coupled at its upper end to the vertical output shaft of a drive instrument 49 for driving in rotation, which is fixed by its case to a mount that is a single piece with the first assembly support. This drive instrument, made, for example, by a step-by-step electric motor is connected by an electric line fitted to the control and command unit 10 so that it is steered by the unit 10 and positions as desired the arm 47 and the drive instrument 28 with cam 27 relative to the distribution device selected for distribution of the required amount of liquid in the container 6. In order to immobilize the arm 47 and the shaft 46 for the time of the distribution of the required quantity of liquid, the body of each distribution device is equipped with an obstructed drill hole open on its upper horizontal side and a pneumatic vertical valve is provided, carried by the arm of the side of its balance weight and intended when it is activated to penetrate by its shaft in the obstructed drill hole of the distributor body diametrically opposed to the one selected.

The shaft 46 between the support arm 47 and its upper end is placed in a guide bearing mounted in the drill hole going through the horizontal plate 45 of the first support assembly 31. The shaft 46 is centered relative to the crown that forms the valve body of the distributors that are oriented so that their shaft 25 expands in a radial manner to the shaft 46 and is turned towards the shaft.

The section down from the conduit of each distribution device is fitted in a drill hole going through the support plate (45) so as to come to be the upstream section (4b) of the conduit of each distribution device (2) being placed in a drill hole going through the support plate (45) so as to come be located, by the distribution nozzle (5), located, by the distribution nozzle (5), above a second horizontal support plate 50 placed under the first one and at a distance from the first one, this second support plate being rigidly attached to the drive shaft 46 in a manner to be driven in rotation with the support arm 47, the container 6 and the gauge component 7 of the liquid quantity in the container being installed on the second plate. The container is positioned with its opening on this plate so that it is in the axis, i.e. is below the discharge nozzle 5 of the distributor device selected to discharge a dosed quantity of liquid contained in the container connected to this distribution device. Advantageously, the position of the plate 50 is adjustable along the axis in order to be able to receive containers having different heights.

Preferably, the sections of the conduits 4b are all rectilinear, vertical and of equal lengths. These devices make it possible to improve the repeatability of the results of the dosages.

Between the plate 50 and the plate 45, the second assembly support is equipped with a protection plate 51 horizontally fixed to the drive shaft 46. This plate has a raised peripheral edge and has projecting on its upper side a projection. This projection and the plate have passing straight through them a single vertical drill hole. This drill hole, by rotation of the shaft is carried into the axis of the nozzle 5 of the distributing device selected and allows the flow of the liquid from the nozzle 5 to the container.

This plate 51 has the purpose of recovering and holding by its raised edge the residual flows of the liquid and of preventing these flows from coming to contaminate the composition made, or even in the course of its creation and to damage the dosage.

Preferably, to the rotating shaft 46 a coder is connected of a known type, connected by an appropriate electric line, to the control and command unit in order to deliver to this unit a signal representing the angular position of the second assembly in the first one.

Figure 6:
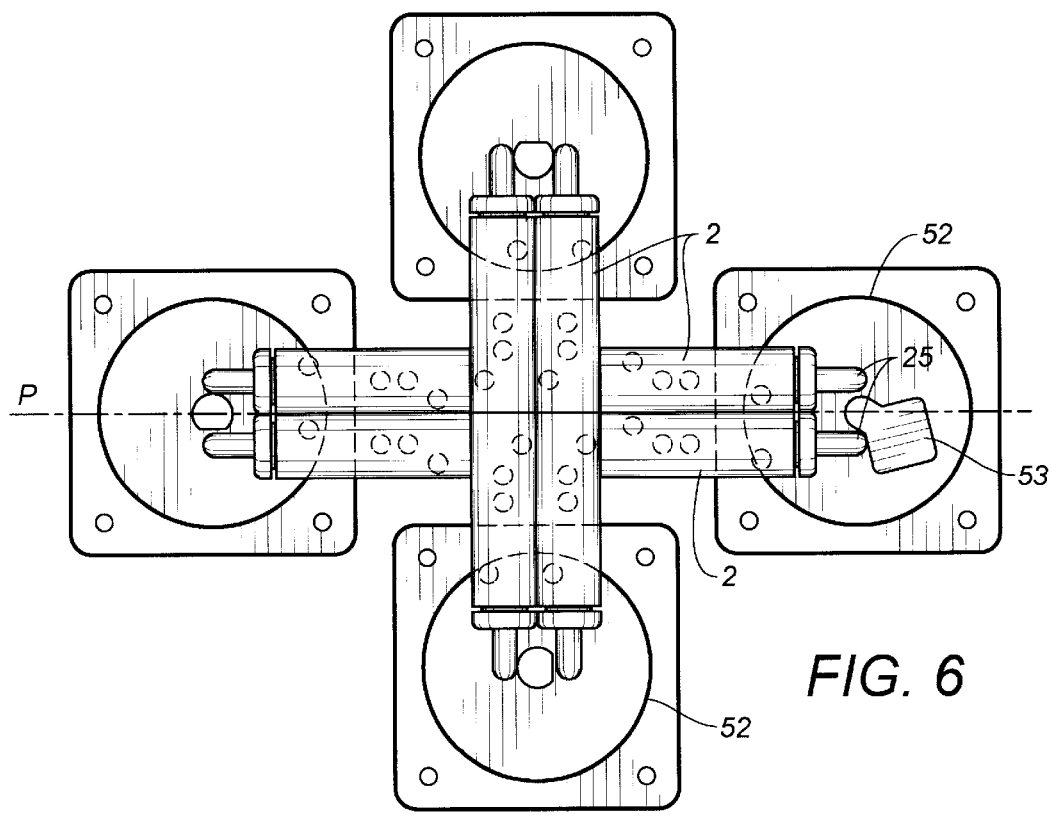
FIGS. 6 and 7 are views of a system according to an embodiment form.
Figure 7:
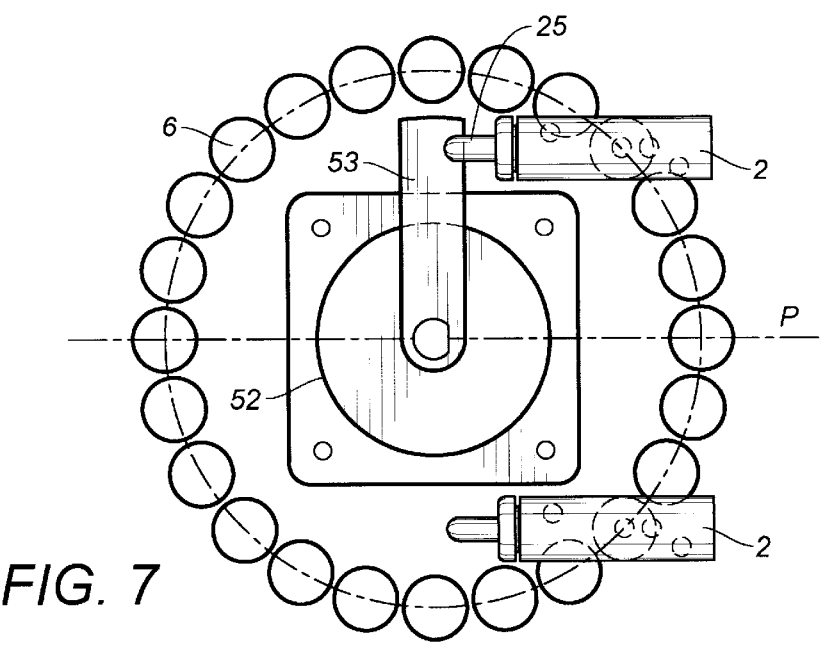

According to another embodiment form of the invention, as can be seen in FIGS. 6 and 7, the two support assemblies 31, 32 are fixed relative to each other and the first assembly support receives in attachment to at least one group of two distribution devices 2, the two distribution devices of the group being arranged in a manner parallel and symmetrical relative to a geometrical vertical plane P and are oriented so that their actuation shafts 25 are turned in the same direction. To this group of distribution devices is connected an actuation mechanism which is appropriate to it, fixed on the second assembly support and consisting of a drive instrument 52 on the output shaft of which a cam 53 is supported. The output shaft of the drive instrument 52 of the actuation mechanism is placed in a vertical manner and the geometrical axis of rotation of this output shaft is placed in the vertical geometrical plane of symmetry P. The cam, supported in rotation on the motor shaft, is intended to be led by one of its cam surfaces by the drive instrument under pressure against the actuation shaft of the impulse mechanism and of the valve of one of the two devices, and by the other cam surface, against the other device. In FIG. 6, you can see that the system consists of several groups of distribution devices and that the two distribution devices of each group are placed side by side. In the case of the figure, the surfaces of the cams are placed according to two vertical planes forming an angle between them. In FIG. 7, you can notice that the installation does not have a single group of distribution devices. These distribution devices are isolated from each other and the surfaces of the cam used are parallel to each other. With one or the other form of the embodiment object of the FIGS. 6 and 7, several containers could be used that are mounted in an immobile manner on a mobile support driven by a drive instrument steered by the command and control unit so as to lead the containers under the discharge nozzles of the distribution devices. To this mobile support, for example, in rotation, a gauge device is connected. These mobile containers can be test tubes, sample tubes, and other containers in which several liquid products are introduced successively.

As a variation, a gauge indicator 7 and a container 6 are connected to each group of the system from FIG. 6.

Of course, the invention presented here can receive any adjustments and variations in the range of equivalent techniques, without leaving the frame defined by the following claims.

What is claimed is:

1. A device for distribution of dosed quantities of a liquid comprising:
    a storage container;
    a conduit connected to said storage container;
    a nozzle connected to said conduit;
    a receiving container positioned so as to receive a discharge of the liquid from said nozzle;
    a gauge means connected to said receiving component, said gauge means for delivering a signal representative of a quantity of liquid in said receiving container;
    a valve means interactive with said conduit for blocking or opening the passage of the liquid through said conduit from said storage container to said nozzle, said nozzle having a diameter such that the liquid in said conduit is immobilized by surface tension forces when said valve means blocks the passage of the liquid, said conduit having an upstream section connected to said storage container and a downstream section having an open end from which said nozzle is formed, said valve means being a slide valve which is normally in a position blocking the passage of the liquid, said upstream section connected to one side of said slide valve, said downstream section connected to another side of said slide valve, said slide valve comprising a valve body in which a housing is formed, said housing having an upstream part and a downstream part communicating with each other via an intermediate section, said intermediate section having a cylindrical form, said slide valve further comprising a valve seat formed in said intermediate section at an opening thereof at said upstream part, a valve member being mobile within said upstream part, said valve resting against said valve seat when said valve means is in the blocking position, said valve body having a first drill hole formed therein such that said upstream part of said housing is connected to said upstream section of said conduit, said valve body having a second drill hole connecting said intermediate section of said housing to said downstream section of said conduit, said valve body having a third drill hole extending along an axis perpendicular to said valve seat and opening into said downstream part of said housing, said third drill hole having a shaft extending therethrough operatively connected to said valve, said shaft being connected to an operating mechanism, said valve being connected to an impulse mechanism.

2. The device of claim 1, further comprising:

an aspiration means interactive with said upstream section of said conduit for aspirating drops of the liquid in the nozzle back into said upstream section.

3. The device of claim 2, said aspiration means comprising:

a piston mounted in a cylindrical bore within said valve body, said cylindrical bore formed in said upstream part of said housing, said piston being connected to said operating mechanism.

4. The device of claim 3, said impulse mechanism comprising:

said piston and said operating mechanism.

5. The device of claim 3, said piston being formed around said shaft and fixed thereto, said shaft and said valve being freely associated together, said operating mechanism having means for mobilizing said shaft from a resting position isolated from said valve to an operating position pushing on said valve.

6. The device of claim 3, further comprising:

an elastic member mounted in said upstream part of said housing and in tensioned relationship between said piston and a shoulder formed between said upstream part and said intermediate section.

7. The device of claim 1, said valve being a ball.

8. The device of claim 1, said valve having a hardness that is greater than a hardness of a material forming said valve seat.

9. The device of claim 1, said operating mechanism comprising:

a cam; and a drive means for driving said cam, said cam being affixed to a rotating output shaft of said drive means.

10. A process for distribution of dosed quantities of a liquid contained in a storage container, the storage container being connected to a conduit having a nozzle suitable for a discharge to a receiving container, the receiving container being connected to a gauge component which delivers a single representative of a quantity of liquid present in the receiving container, a valve component interactive with the conduit so as to block or open a passage of the liquid through the conduit from the storage container to the nozzle, the nozzle having a diameter such that the liquid in the conduit is immobilized by the surface tension forces when the valve component blocks the passage of the liquid, the process comprising the steps sequentially of:

opening the passage of the liquid between the storage container and the nozzle by actuating the valve component so that the liquid fills a portion of the conduit between the valve component and the nozzle;

blocking the passage of the liquid by actuating the valve component;

applying at least one mechanical impulse having a calibrated amplitude onto the portion of the conduit between the valve component and the nozzle so as to expel a micro-quantity of the liquid through the nozzle toward the receiving container;

comparing a value indicated by the gauge component to a preset reference value representative of a value of a dose of the liquid to be delivered, said reference value having a tolerance; and repeating the steps of applying and comparing when the value indicated by the gauge component is not within the tolerance of said reference value.

* * * * *